April 24, 1945.　　O. F. DAVIS　　2,374,424
CULTIVATOR
Filed Nov. 8, 1943　　2 Sheets-Sheet 1
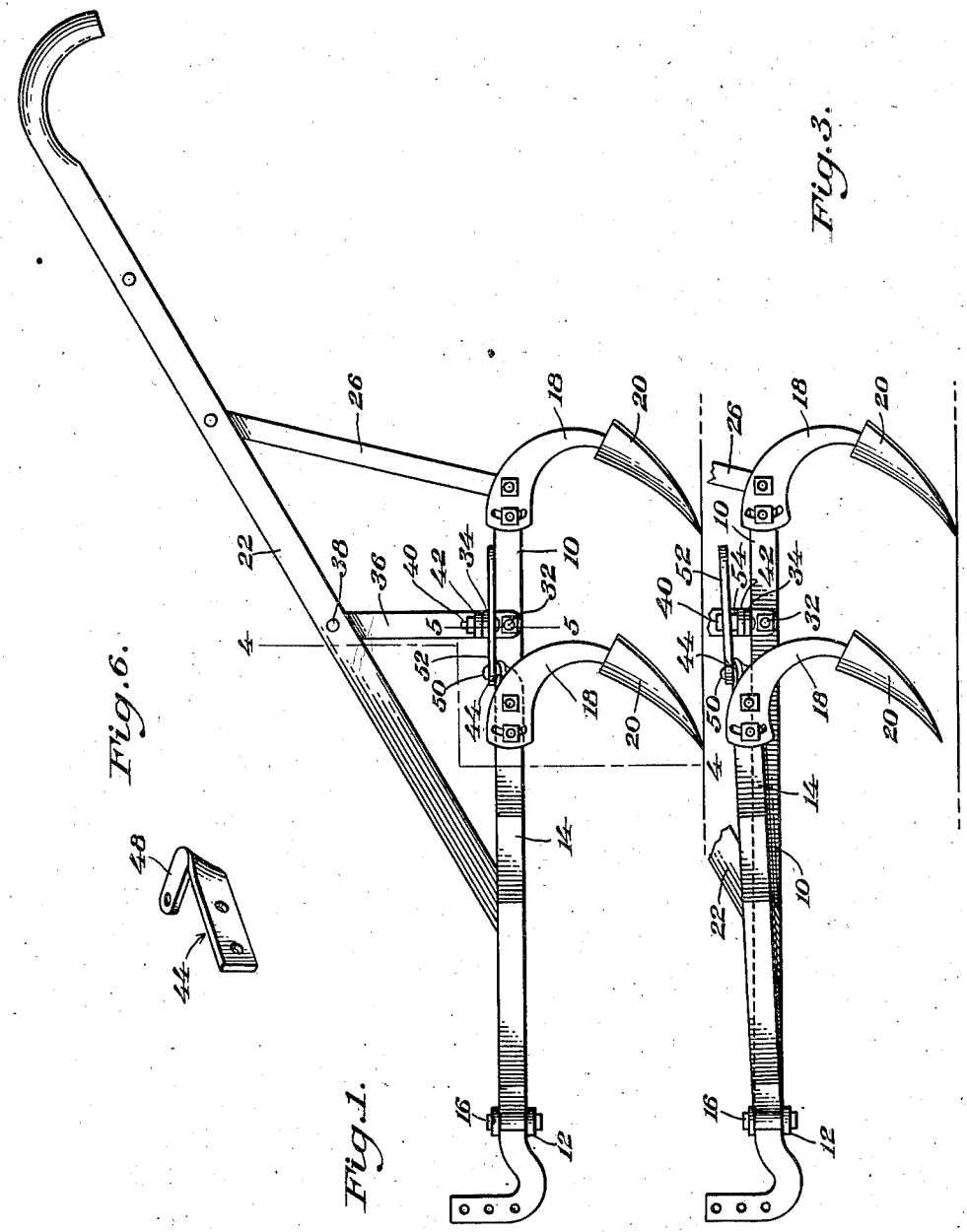
INVENTOR.
Ocie F. Davis:
BY
Victor J. Evans & Co.
ATTORNEYS April 24, 1945.   O. F. DAVIS   2,374,424
CULTIVATOR
Filed Nov. 8, 1943   2 Sheets-Sheet 2
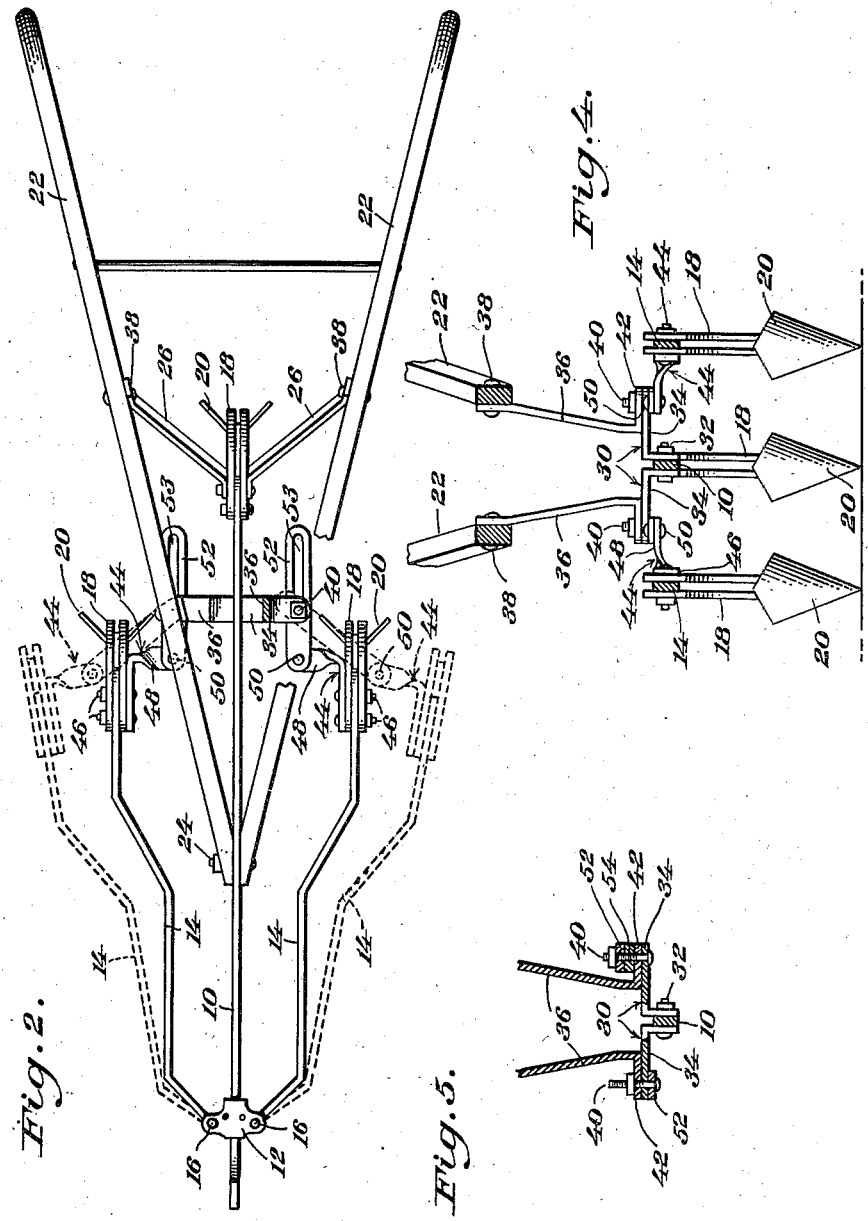
INVENTOR.
Ocie F. Davis:
BY
Victor J. Evans & Co.
ATTORNEYS Patented Apr. 24, 1945

2,374,424

UNITED STATES PATENT OFFICE 2,374,424

CULTIVATOR

Ocie F. Davis, Gadsden, Ala.

Application November 8, 1943, Serial No. 509,463

2 Claims. (Cl. 97—172)

My invention relates to agricultural implements, and has among its objects and advantages the provision of an improved cultivator.

In the accompanying drawings:

Figure 1 is a side view of a cultivator in accordance with my invention.

Figure 2 is a plan view with portions broken away.

Figure 3 is a fragmentary side view.

Figure 4 is a sectional view along the line 4—4 of Figure 1.

Figure 5 is a sectional view along the line 5—5 of Figure 1, and

Figure 6 is a perspective view of an adjusting member.

In the embodiment of the invention selected for illustration, the cultivator includes a central beam 10 provided with a head 12 to which are connected two side beams 14. These side beams are pivotally connected at 16 with the head 12 for adjustment about vertical axes. Shanks 18 are attached to the rear ends of the respective beams 10 and 14, which beams support the ground tilling plows or tools 20.

Handles 22 are fixedly connected at 24 with the beam 10, which handles are additionally supported by braces 26 bolted to the handles and to the central shank 18.

To the beam 10 are connected two angles 30, as by a bolt 32. These angles are so positioned as to provide horizontal arms 34 lying in a common plane and projecting laterally from the beam 10. Brace members 36 are bolted at 38 to the handles 22, and bolts 40 extend through the feet 42 at the lower ends of the braces 36 and the arms 34.

Angle members 44 are bolted at 46 to the beams 14 and are twisted to provide arms 48 lying in horizontal planes and pivotally connected at 50 with bars 52 lying underneath the arms 34. These bars are slotted at 53 for the reception of the bolts 40. Thus the side beams 14 may be pivoted toward and away from the beam 10 to change the spacing between the plows 20. When the beams have been adjusted to desired positions, the bolts 40 are tightened to hold the bars 52 against accidental shifting.

Provision is made for raising or lowering either side beam 14. It frequently happens that the field under cultivation is such that one plow must follow a furrow or must cultivate an elevation, such as the edge margin of a bed or other high ground formation. When the side plows are engaging deeper than the central plow, the implement is difficult to control and tends to oscillate laterally. To adjust the side plows 20 vertically, Figure 5 illustrates one of the bars 52 as being arranged above one of the feet 42, and a washer 54 is interposed between the bar and foot 42. This will elevate the beam 14 on that side of the implement. Either or both beams may be adjusted vertically in the same manner, and additional washers may be employed in cases where the beam or beams are to be lifted considerable amounts.

The bars 52 may be located either above or below the arms 34. Under ordinary cultivation conditions, these bars are preferably arranged underneath the arms. Figure 4 illustrates one of the side beams in an elevated position through insertion of a washer 54.

Without further elaboration, the foregoing will so fully explain my invention, that others may, by applying current knowledge, readily adapt the same for use under various conditions of service.

I claim:

1. A cultivator comprising a central beam having a head, a pair of side beams pivoted to the head and extending out angularly from the respective sides of the central beam, plows on the side beams, an angled member bolted to each side beam and extending inwardly toward the central beam, a slotted member pivotally connected on one end to each angled member, angled members connected to the central beam and extending outwardly therefrom toward the side beams, and bolts connecting the last mentioned angled members to the slotted members whereby to adjust the slotted members and side beams with reference to the central beam.

2. A cultivator comprising a central beam having a head, a pair of side beams pivoted to the head and extending out angularly from the respective sides of the central beam, plows on the side beams, handles connected to the central beam, an angled member bolted to each side beam and extending inwardly toward the central beam, a slotted member pivotally connected at one end to each angled member, angled members connected to the central beam and extending outwardly therefrom toward the side beams, braces from the handles to the latter angled members, bolts connecting the latter members, and braces to the slotted members whereby to adjust the slotted members and side beams with respect to the central beam, and means for adjusting said side beams vertically and independently.

OCIE F. DAVIS.